(12) United States Patent
Dücker et al.

(10) Patent No.: US 8,985,825 B2
(45) Date of Patent: Mar. 24, 2015

(54) HEADLIGHT FOR A VEHICLE

(76) Inventors: Heinz Dücker, Erwitte (DE); Christoph Wollenweber, Geseke (DE)

(*) Notice: Subject to any disclaimer, the term of this patent is extended or adjusted under 35 U.S.C. 154(b) by 0 days.

(21) Appl. No.: 13/820,096

(22) PCT Filed: Aug. 30, 2010

(86) PCT No.: PCT/EP2010/062629
§ 371 (c)(1),
(2), (4) Date: Feb. 28, 2013

(87) PCT Pub. No.: WO2012/028170
PCT Pub. Date: Mar. 8, 2012

(65) Prior Publication Data
US 2013/0155711 A1 Jun. 20, 2013

(51) Int. Cl.
*F21V 29/00* (2006.01)
*B60Q 1/04* (2006.01)
*F21S 8/10* (2006.01)
*F21Y 101/02* (2006.01)

(52) U.S. Cl.
CPC .............. *B60Q 1/04* (2013.01); *F21S 48/1104* (2013.01); *F21S 48/1159* (2013.01); *F21S 48/1241* (2013.01); *F21V 29/004* (2013.01); *F21S 48/1317* (2013.01); *F21Y 2101/02* (2013.01)

USPC ............ 362/547; 362/516; 362/241; 362/294

(58) Field of Classification Search
USPC ......... 362/516–518, 544, 545, 547, 294, 345, 362/373, 235, 249.01, 240, 241, 247, 362/249.02, 249.06
See application file for complete search history.

(56) References Cited

U.S. PATENT DOCUMENTS

| 8,132,947 B2 * | 3/2012 | Shih ............................ 362/547 |
| 2008/0225541 A1 * | 9/2008 | Ishida et al. .................. 362/516 |

FOREIGN PATENT DOCUMENTS

| DE | 102007061304 A1 | 6/2008 |
| DE | 102008009820 A1 | 9/2008 |
| DE | 102008011647 A1 | 9/2008 |

* cited by examiner

*Primary Examiner* — Thomas M Sember
(74) *Attorney, Agent, or Firm* — Husch Blackwell LLP

(57) ABSTRACT

A headlight for a vehicle having a housing in which LED modules and a reflector are accommodated, wherein the LED modules irradiate light into the reflector and wherein the light reflects at the reflector and leaves the headlight. It is inventively provided that the LED modules each have a cooling receptacle body, wherein the LED modules are mounted on the reflector by means of the respective cooling receptacle body.

16 Claims, 2 Drawing Sheets

HEADLIGHT FOR A VEHICLE

CROSS REFERENCE

This application claims priority to PCT Application No. PCT/EP2010/062629 filed Aug. 30, 2010, which is expressly incorporated in its entirety reference herein.

TECHNICAL FIELD OF THE INVENTION

The present invention relates to a headlight for a vehicle having a housing in which LED modules and a reflector are accommodated, wherein the LED modules irradiate light into the reflector and wherein the light reflects at the reflector and leaves the headlight.

BACKGROUND OF THE INVENTION

A headlight for a vehicle having a housing, wherein LED modules are mounted on the inside of the housing, is known from DE 10 2007 061 304 A1. The LED modules emit light in the direction of a reflector, wherein LED modules are arranged equally distributed on the circumference of the housing at a distance from the central axis of the headlight. The reflector is divided into four reflector segments and each LED module emits light into an allocated reflector segment. The housing for accommodating the LED modules is manufactured from a metallic material in order to enable good thermal conduction, since LED modules have strong heat generation, so that the heat can be discharged via the housing. For this purpose, the housing has external cooling ribs in order to further improve the thermal removal. The LED modules are disadvantageously accommodated directly in the housing, so that a replacement of the LED is complicated or not even possible. In addition, the cooling ribs arranged externally on the circumference of the housing can be disadvantageous. The LED modules usually have to be adjusted in order to occupy the correct position across from the reflector segments, wherein an adjustment of the LED modules is not possible using the arrangement shown.

DE 10 2008 011 647 A1 shows an additional headlight for a vehicle with a housing, and LED modules are mounted on holding blocks which are mounted in the housing of the headlight. Due to the arrangement of the holding blocks in the housing of the headlight, only a poor thermal removal is possible, and the adjustment of the LED modules with regard to the reflector segments is more complicated or not even possible. Disadjustment can result, in particular during shock loads of the headlight, as no direct coupling is provided between the holding block and the reflector.

It is therefore the object of the present invention to create a headlight for a vehicle, by means of which the disadvantages of the previously described prior art are surmounted and the LED modules have an improved arrangement.

This problem is solved proceeding from a headlight for a vehicle according to the preamble of claim 1 in connection with the characterizing features. Advantageous embodiments of the invention are indicated in the dependent claims.

SUMMARY OF THE INVENTION

The invention incorporates the technical teaching that the LED modules each have a cooling receptacle body, wherein the LED modules are mounted on the reflector by means of the respective cooling receptacle bodies.

The invention arises from the concept of creating a cooling receptacle body for accommodating the LED module, wherein the cooling receptacle body takes on a cooling function as well as the receptacle function for mounting the LED module. The special advantage is that the cooling receptacle body for the LED module is mounted directly on the reflector. The reflector, which can consist of a metal die-casting material, is correspondingly equipped for this purpose. Thus, a thermal removal can already occur via the reflector, wherein in particular the reflector comprises not only the reflector segments for reflecting the light, but the reflector also has corresponding structures at a distance to the central axis thereof, which structures enable a thermal removal from the cooling receptacle bodies. In particular, a thermal transportation takes place from the cooling receptacle body into the reflector.

The reflector preferably forms a structural unit with the LED modules, which unit can be accommodated in the housing. This overcomes the disadvantage that necessitates a complex arrangement of the LED modules in the housing of the headlight. The reflector can be finished with the LED modules in a substantially simplified way, and the structural unit made from the reflector with the LED modules can be installed into the housing of the headlight.

Advantageously, three LED modules are arranged on the reflector, which are equally distributed at 120° angles to each other around a central axis of the headlight and arranged at a distance from the central axis. Thus, the LED modules radiate light at an angle into the reflector, which points at least in the direction toward the central axis of the headlight. The headlight is preferably designed as a high beam headlight and emits substantially parallel light beams having a specific aperture angle. The fixed connection between the LED modules and the reflector ensures that the LED modules maintain an exact position relative to the reflector segments.

The reflector can in particular have three reflector segments, wherein one reflector segment in the reflector is allocated to each LED module. Alternatively, the headlight can have two LED modules, four LED modules, or more. The LED modules are thereby preferably arranged equidistance on the outside of the reflector. The reflector segments can form free-form surfaces that are designed in such a way that the light from the LED modules reflects at the reflector segments in such a way that the light leaves the headlight as substantially parallel light bundles. In particular, the LED modules should not be configured as point light sources so that the configuration of the reflector segments as free-form surfaces can be adjusted to the light emission across the planar extension of the LED emitters. The reflector segments form basin or bowl-shaped segments, which each abut each other. The outer circumference of the reflector can thereby have a circular shape, and the LED modules protrude in such a way over the reflector segments so that the LEDs substantially completely illuminate the reflector segments without substantially disrupting the reflected light.

According to a preferred embodiment of the inventive mounting of the LED module on the reflector, the reflector has mounting recesses into which the LED modules can be inserted. The mounting recesses are designed as pocket shaped and are configured such that said mounting recesses point with an opening for inserting the LED modules in the direction of the central axis of the reflector. In particular, the mounting recesses can have a thermal transmission surface at which a contact surface of the cooling receptacle body abuts when the LED modules are arranged on the reflector. The LED modules can be inserted in the mounting recesses in tongue and groove configurations and thereby exactly positioned. Further, undercuts, in particular according to a type of dovetail guide, can be provided in order to further improve the exact position of the LED modules in the mounting recesses. In particular, the thermal transfer from the cooling receptacle body into the mounting recess of the reflector is further improved by increasing the contact surface between the cooling receptacle bodies and the mounting recess in the reflector. The contact between the reflector and the modules thus has as a whole a greater planar extension, so that an improved thermal removal can occur via the reflector.

If the LED modules are inserted into the mounting recesses in the reflector from the direction of the central axis, then the LED modules can, upon reaching the desired position, be connected to the reflector in the arrangement in the mounting recesses via connection means, in particular via screw elements. The screw element can be screwed in from the outside of the reflector from the radial direction orthogonal to the central axis of the reflector, such that during removal of the light module only the screw element has to be loosened in order to be able to remove the LED module from the mounting recess.

A further improvement of the thermal removal is achieved if the cooling receptacle bodies have cooling ribs, in particular if the body of the reflector has further cooling ribs in the outside region of the mounting recesses. By means of the cooling ribs on the cooling receptacle body, heat can be directly emitted from the cooling receptacle body, wherein by means of the cooling ribs on the reflector, the heat can be emitted which transfers from the cooling receptacle body into the reflector. Preferably, the cooling ribs are therefore arranged on the reflector in the outside region of the mounting recesses.

According to a preferred embodiment of the headlight, said headlight can have a navigation light function or parking light function. For this purpose, light conducting elements can be provided into which light can be irradiated by further LED elements. The LED elements for irradiating light into the light conducting elements can be designed at a lower output so that the light output which is provided by the LED elements corresponds to the light output of a navigation light.

In particular, the LED elements can be arranged on the back side of the reflector, wherein the light conducting elements extend from the back side through the reflector to the light-reflecting front side of the reflector and are preferably arranged in the regions in the reflector, in which the reflector segments abut each other. For example, three light conducting elements having respectively allocated LED elements can be incorporated in the reflector, wherein in particular the number of light conducting elements and of the LED elements can correspond to the number of or a multiple of the number of LED modules. The light conducting elements can have a disk-shaped form, and the light is coupled in through the LED elements via the edges of the disk-shaped light conducting elements such that the light coupled in can be decoupled again from the light conducting elements via an opposite edge, which edge is located on the front side of the reflector. As a result, a navigation light can be formed, which has three or a corresponding number of emission regions which are equally distributed at 120° angles or at corresponding angles to each other arranged around the central axis of the headlight.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
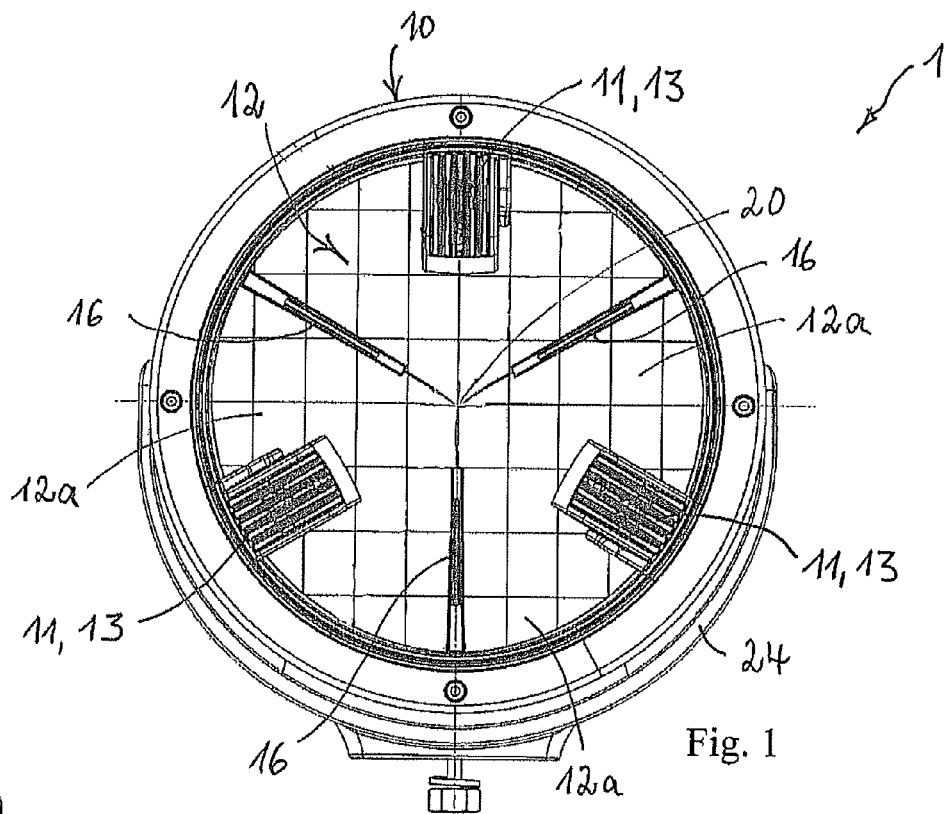
FIG. 1 a front view of a headlight for a vehicle with the features of the present invention, FIG. 2a a cross-sectional view of a headlight for a vehicle according to FIG. 1, FIG. 2b a detail view of a region of the cross section of the headlight according to FIG. 2a, FIG. 3 an additional cutaway view of the headlight for a vehicle with the features of the present invention, and FIG. 4 a detail view of the arrangement of an LED module in the reflector of the headlight.

FIG. 1 shows an embodiment of a headlight 1 for a vehicle having the features of the present invention. The headlight 1 has a housing 10 and can be fixed to the front side of a vehicle via a mounting bracket 24 in which the headlight 1 is accommodated via the housing 10.

The headlight 1 is shown from the front side, and three LED modules 11 are arranged equally distributed around the central axis 20 of the headlight 1. The LED modules 11 are arranged at a 120° angle to each other and fixed on the reflector 12 of the headlight 1. The reflector 12 has three reflector segments 12a, and each LED module 11 is allocated to a reflector segment 12a. The LED modules 11 each have a cooling receptacle body 13, in which LEDs are accommodated, which point in the direction to the reflector segment 12a and are therefore not visible.

Light conducting elements 16 are incorporated into the reflector 12 of the headlight 1 at an offset of 60° between LED modules 11. The light conducting elements 16 are located in the transitions between the reflector segments 12a and have a disk-shaped structure, and the disk shape extends radially to the central axis 20. Light can be coupled into the light conducting elements 16 from the backside of the reflector 12, and the light coupled in is decoupled again from the light conducting elements 16 on the front side of the reflector 12. Thus, a navigation light function or a parking light function can be enabled via the light conducting elements 16.

Figures 2A, 2B:
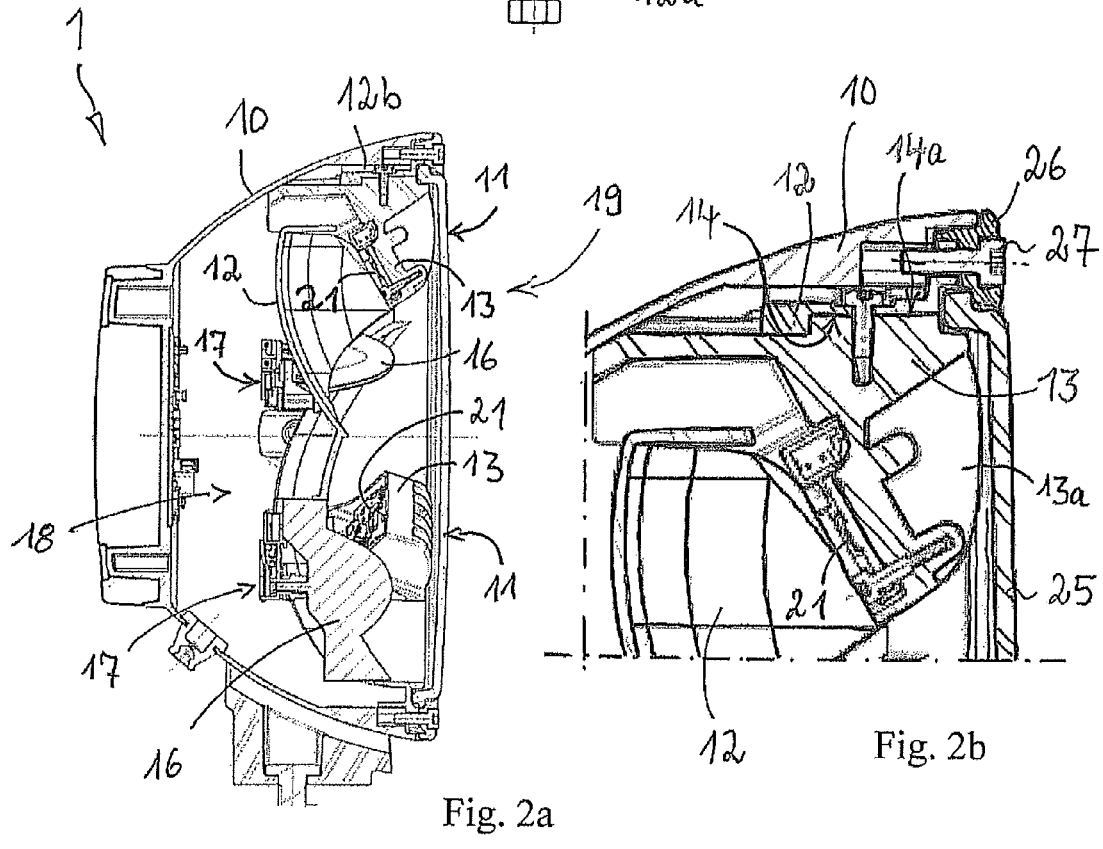

FIG. 2a shows a headlight 1 in a cross-sectional side view, and FIG. 2b shows a detail section of the cross section of the headlight 1 according to FIG. 2a. The cross section runs through the housing 10 and the reflector 12 of the headlight 1 in one plane, in which an LED module 11 lies in the upper half in the cross section of the headlight 1 and a light conducting element 16 in the lower half of the headlight 1. The LED module 11 accommodates the LED 21, which emits light in the direction of the reflector 12. The base body of the LED module 11 is formed as a cooling accommodation body 13, and the arrangement of the cooling accommodation body 13 in a mounting recess 14 of the reflector 12 is shown in the detail view. The reflector 12 with the cooling accommodation body 13 and the LED 21 is incorporated into the housing 10 as a structural unit.

In order to optimize the heat transfer between the cooling receptacle body 13 and the mounting recess 14 of the reflector 12, the mounting recess 14 has a thermal transmission surface 14a, at which the cooling receptacle body 13 abuts. The cooling accommodation body 13 is screwed to the reflector 12 via a screw element 15. By this means, it is achieved that a surface pressure is generated between the surface of the cooling accommodation body 13 and the thermal transfer surface 14a of the mounting recess 14 in order to optimize the heat transfer into the reflector 12.

The headlight 1 has a lens 25 on the light output side, which lens is accommodated via a retaining ring 26. The retaining ring 26 is screwed to the front side of the housing 10 of the headlight 1 using screw elements 27.

The reflector 12 has cooling ribs 12b, and further cooling ribs 13a are located on the cooling receptacle body 13. Due to the arrangement of the LED modules 11 on the reflector 12, the component formed from the reflector 12 and the LED modules 11 forms a thermal unit which can be inserted into the housing 10 of the headlight 1. A heat transfer via the cooling ribs 12b and 13a takes place on the inside in the housing 10 of the headlight 1, wherein due to the inventive arrangement, a thermal is created in the headlight 1, for which a critical temperature is not exceeded.

Figure 3:
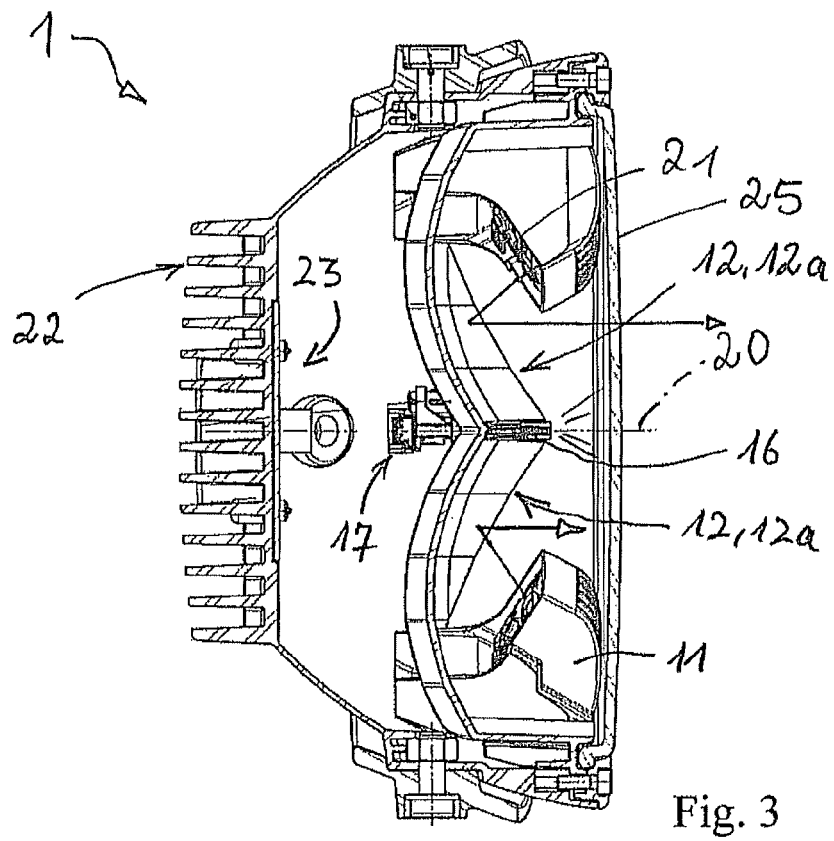

FIG. 3 shows the headlight 1 in an additional cutaway view, and the housing 10 is shown with the housing cooling bodies 22. On the inner side of the housing cooling bodies 22 is located an electrical control unit 23 for controlling the LED element 17 for creating the navigation light function and the LED 21 for creating the main light function. By means of the cutaway view of the reflector 12, the arrangement of the LED element 17 can be recognized, through which light can be coupled into the disk-shaped light conducting element 16. The decoupling of the light out of the light conducting element 16 is indicated by light beams, wherein the LED element 17 for forming the navigation light function stops functioning when the LEDs 21 are operating, which are accommodated in the LED module 11, in order to fulfill the main light function. The light emitted by the LEDs 21 reflects off the surface of the reflector segments 12a and leaves the headlight through the lens 25, wherein the radiation path of the light is indicated by arrows.

Figure 4:
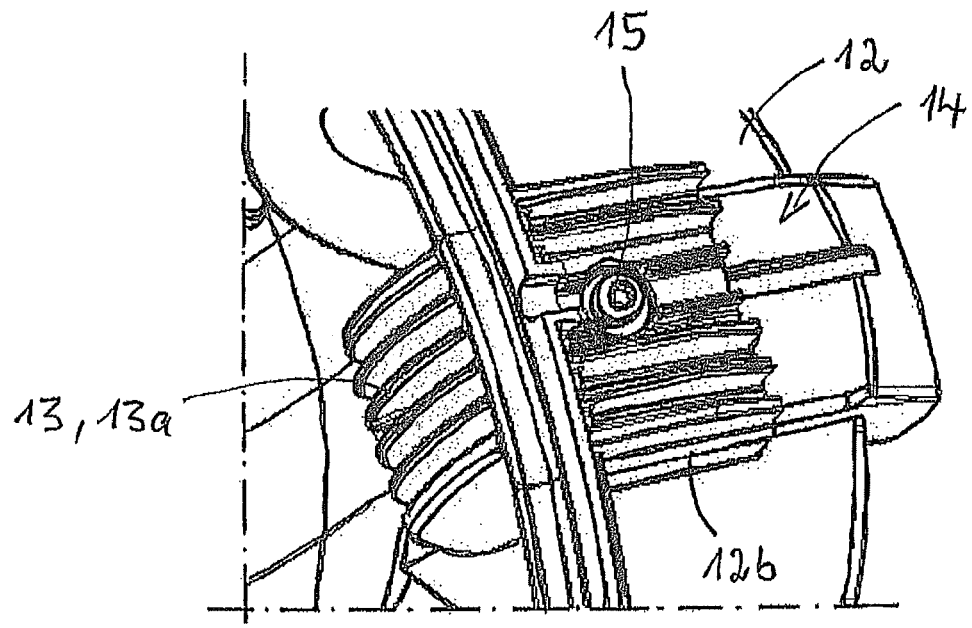

FIG. 4 shows in a detail view the arrangement of the cooling accommodation body 13 in the mounting recess 14 of the reflector 12. The mounting recess 14 is depicted from the outside, wherein the cooling accommodation body 13 is shoved into the mounting recess 14 on the inner side. If the cooling accommodation body 13 has been inserted into the desired position in the mounting recess 14, then the cooling accommodation body 13 is screwed in the mounting recess 14 of the reflector 12 by the screw element 15. The view additionally shows cooling ribs 12b on the backside of the reflector 12 as well as cooling ribs 13a on the upper side of the cooling accommodation body 13. By this means, multiple cooling ribs 12b and 13a are located in the proximate thermal vicinity of the LED element 17, and heat released by the operation of the LED element 17 can be sufficiently discharged.

The invention is not limited in the execution thereof to the previously indicated preferred embodiment. Rather, a number of variants is conceivable, which make use of the solution depicted, even in fundamentally differently designed executions. All of the features and/or advantages, including structural details, spatial arrangements, and method steps proceeding from the claims, the description, or the drawings can be inventively essential in and of themselves and also in the most varied combinations. In particular, the headlight 1 can also be executed as a component part of a main headlight of a vehicle, so that the headlight 1 forms a light module that is incorporated into the housing of a main headlight of the vehicle.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCES 1 headlight
10 housing
11 LED module
12 reflector
12a reflector segment
12b cooling rib
13 cooling receptacle body
13a cooling rib
14 mounting recess
14a heat transfer surface
15 connecting means, screw element
16 light conducting element
17 LED element
18 back side
19 front side
20 central axis
21 LED
22 housing cooling body
23 electrical control unit
24 mounting bracket
25 lens
26 retaining ring
27 screw element

The invention claimed is:

1. A headlight for a vehicle, comprising:
 a housing;
 at least one LED module and a reflector arranged within said housing, wherein said LED module irradiates light onto said reflector which in turn reflects light from said LED module out of said headlight;
 said LED module further comprising a cooling receptacle body and wherein said LED module is mounted on said reflector by said respective cooling receptacle body;
 wherein said reflector further comprises at least one mounting recesses into which said LED module is inserted; and
 wherein said cooling receptacle body is provided with at least a first cooling rib and wherein said reflector is also provided with at least a second cooling rib adjacent to said mounting recess.

2. The headlight according to claim 1, wherein said reflector forms a structural unit with said LED module, which structural unit is accommodated in said housing.

3. The headlight according to claim 1, further comprising at least second and third LED modules and wherein said LED modules are mounted on said reflector at 120° angles to each other around a central axis of said headlight and at a distance from said central axis.

4. The headlight according to claim 3, wherein said reflector further comprises reflector segments and wherein each of said reflector segments is allocated to one of said LED modules.

5. The headlight according to claim 1, wherein said mounting recess has a heat transfer surface at which a contact surface of the cooling receptacle body abuts when said LED module is mounted on said reflector.

6. The headlight according to claim 1, wherein said LED module is secured in said mounting recess by a screw element.

7. The headlight according to claim 1, further comprising at least one LED element and at least one light conducting element and wherein light is irradiated into said light conducting element by said LED element.

8. The headlight according to claim 7, wherein said reflector further comprises reflector segments and wherein each of said reflector segments is allocated to one of said LED modules; and
wherein said LED element is arranged on a rear side of said reflector, wherein said light conducting element extends from said rear side of said reflector through to a light reflecting front side of said reflector and through said light reflecting front side and wherein said light conducting elements are arranged where said reflector segments abut each other.

9. A headlight for a vehicle, comprising:
a housing;
at least one LED module and a reflector arranged within said housing, wherein said LED module irradiates light onto said reflector which in turn reflects light from said LED module out of said headlight;
said LED module further comprising a cooling receptacle body and wherein said LED module is mounted on said reflector by said respective cooling receptacle body;
further comprising at least one LED element and at least one light conducting element, wherein light is irradiated into said light conducting element by said LED element;
wherein said reflector further comprises reflector segments and wherein each of said reflector segments is allocated to one of said LED modules; and
wherein said LED element is arranged on a rear side of said reflector, wherein said light conducting element extends from said rear side of said reflector through to a light reflecting front side of said reflector and through said light reflecting front side and wherein said light conducting elements are arranged where said reflector segments abut each other.

10. The headlight according to claim 9, wherein said reflector forms a structural unit with said LED module, which structural unit is accommodated in said housing.

11. The headlight according to claim 9, further comprising at least second and third LED modules and wherein said LED modules are mounted on said reflector at 120° angles to each other around a central axis of said headlight and at a distance from said central axis.

12. The headlight according to claim 11, wherein said reflector further comprises reflector segments and wherein each of said reflector segments is allocated to one of said LED modules.

13. The headlight according to claim 9, wherein said reflector further comprises at least one mounting recesses into which said LED module is inserted.

14. The headlight according to claim 13, wherein said mounting recess has a heat transfer surface at which a contact surface of the cooling receptacle body abuts when said LED module is mounted on said reflector.

15. The headlight according to claim 13, wherein said LED module is secured in said mounting recess by a screw element.

16. The headlight according to claim 13, wherein said cooling receptacle body is provided with at least a first cooling rib and wherein said reflector is also provided with at least a second cooling rib adjacent to said mounting recess.

* * * * *